United States Patent [19]

Lin

[11] Patent Number: 5,762,426
[45] Date of Patent: Jun. 9, 1998

[54] BOTTOM BRACKET BALL BEARING AXLE MOUNTING STRUCTURE FOR A BICYCLE

[76] Inventor: Wen-Hwa Lin, No. 812, Chan Shen Rd., Tiah Shen Tsun, Wei Pu Hsiang, Taichung Hsien, Taiwan

[21] Appl. No.: 886,940

[22] Filed: Jul. 2, 1997

[51] Int. Cl.[6] .................................................. F16C 19/08
[52] U.S. Cl. ................................... 384/458; 384/545
[58] Field of Search ................................... 384/458, 545, 384/517, 570, 510, 537

[56] References Cited

U.S. PATENT DOCUMENTS

| | | | |
|---|---|---|---|
| 4,605,321 | 8/1986 | Brandenstein et al. | 384/458 |
| 5,209,581 | 5/1993 | Nagano | 384/545 |
| 5,597,242 | 1/1997 | Beeler | 384/517 |

*Primary Examiner*—Lenard A. Footland
*Attorney, Agent, or Firm*—Varndell Legal Group

[57] ABSTRACT

A bottom bracket bearing axle for a bicycle, including two screw caps fastened to two opposite ends of a bottom bracket to hold two ball bearings, a bottom bracket bearing axle supported on the ball bearings, and a bush mounted around the bottom bracket bearing axle within the bottom bracket, wherein the ball bearings are respectively mounted around bottom bracket bearing axle within the screw caps and having respective balls respectively supported on a respective annular flange of the bottom bracket bearing axle at an outer side; the bush is comprised of two symmetrical halves fastened together by a dowel joint and mounted within the bottom bracket around the bottom bracket bearing axle between the ball bearings, having a corrugated outside wall and two end flanges at two opposite ends respectively stopped against the ball bearings.

1 Claim, 4 Drawing Sheets

BOTTOM BRACKET BALL BEARING AXLE MOUNTING STRUCTURE FOR A BICYCLE

BACKGROUND AND SUMMARY OF THE INVENTION

The present invention relates to a bottom bracket ball bearing axle mounting structure for a bicycle, and more particularly to such a bottom bracket ball bearing axle mounting structure which is easy to install and inexpensive to manufacture.

A regular bottom bracket ball bearing axle mounting structure for bicycle as shown in FIGS. 1 and 2, is generally comprised of a bottom bracket 17, a bottom bracket wheel axle 12 mounted in the bottom bracket 17 and having two opposite ends respectively extended out of two opposite sides of the bottom bracket and two annular flanges 121; 122 raised around the periphery and equally spaced from its both ends, two screw caps 13; 14 fastened to the bottom bracket 17 at two opposite sides to hold the bottom bracket wheel axle 12 in place, two ball bearings 15; 16 respectively mounted in the screw caps 13; 14 to support the bottom bracket bearing axle 12 with balls thereof respectively supported on the annular flanges 121; 122 of the bottom bracket bearing axle 12 at an outer side, and a bush mounted within the bottom bracket 17 around the bottom bracket bearing axle 12 between the ball bearings. The annular flanges 121; 122 have different outer diameters so that the bush 11 can be sleeved onto the bottom bracket bearing axle 12 and moved over the small annular flange 121 and then stopped at the bigger annular flange 122. Because the annular flanges 121; 122 have different outer diameters, the processing procedure of the bottom bracket bearing axle 12 is complicated. Furthermore, because the bush 11 is made in integrity and adapted to fit the bottom bracket bearing axle, its specification is critical.

It is one object of the present invention to provide a bottom bracket ball bearing axle mounting structure which is easy to install. It is another object of the present invention to provide a bottom bracket ball bearing axle mounting structure which is inexpensive to manufacture. According to one aspect of the present invention, the two annular flanges of the bottom bracket bearing axle have the same outer diameter therefore the processing procedure of the bottom bracket bearing axle is simple. According to another aspect of the present invention, the bush is comprised of two symmetrical halves fastened together by a dowel joint and mounted within the bottom bracket around the bottom bracket bearing axle between the ball bearings, having a corrugated outside wall and two end flanges at two opposite ends respectively stopped against the ball bearings.

DETAILED DESCRIPTION OF THE PREFERRED EMBODIMENT

Figure 1:
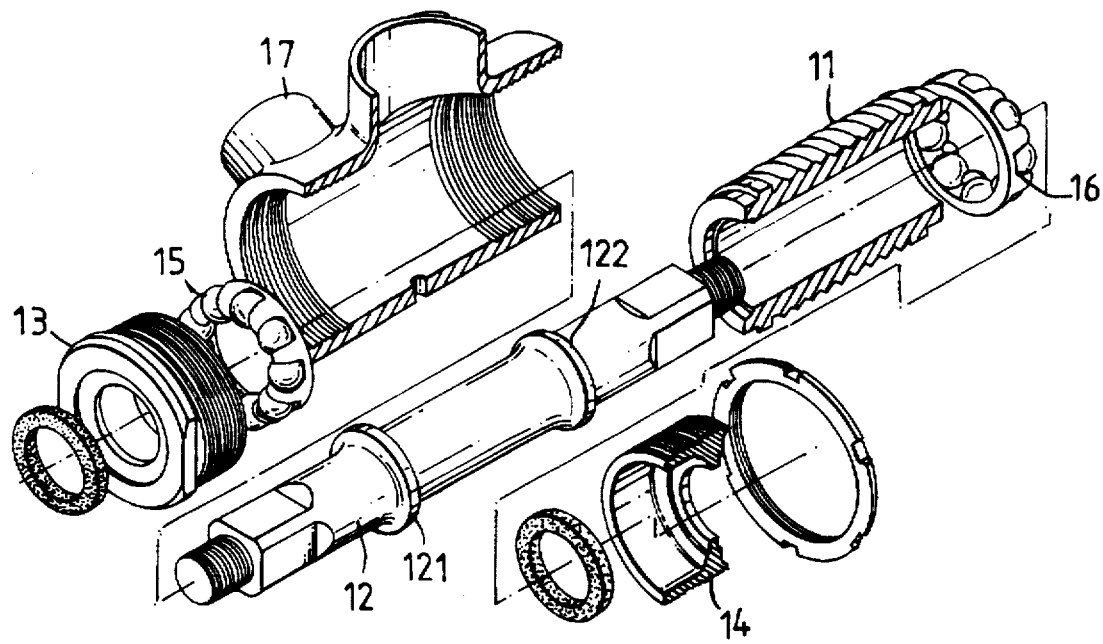
FIG. 1 is an exploded view of a bottom bracket bearing axle mounting structure according to the prior art.
Figure 2:
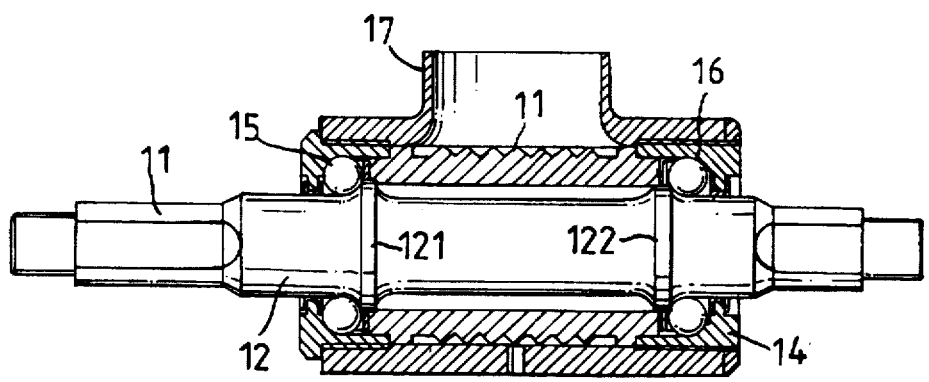
FIG. 2 is a sectional assembly view of the bottom bracket bearing axle mounting structure of FIG. 1.
Figure 3:
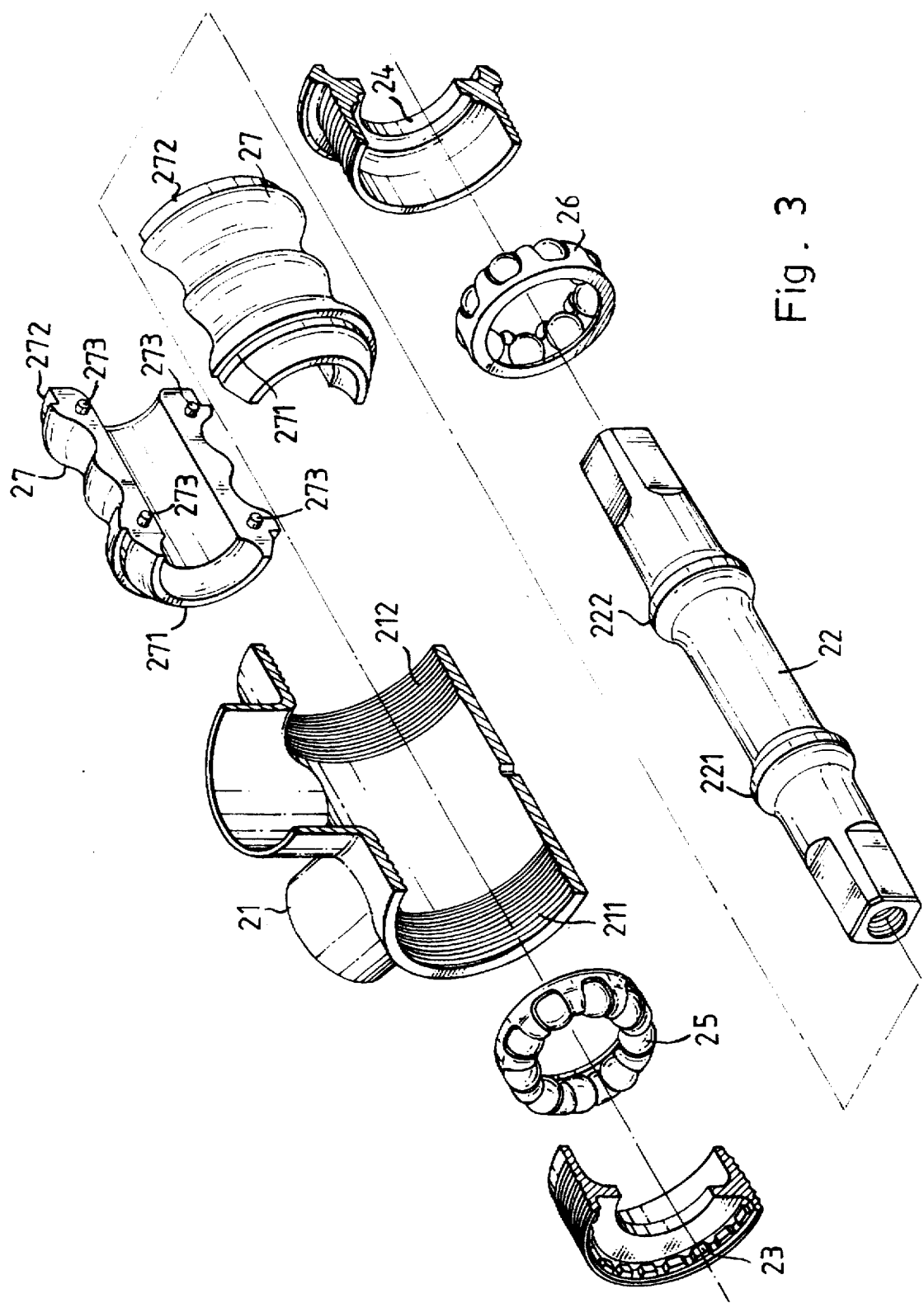
FIG. 3 is an exploded view of a bottom bracket bearing axle mounting structure according to the present invention.
Figure 4:
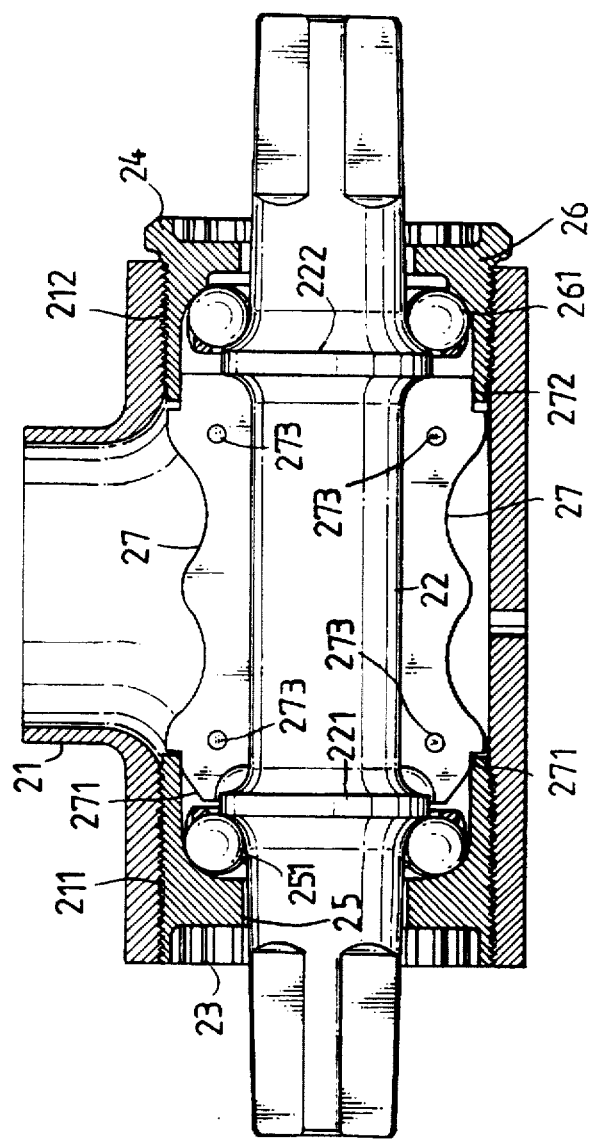
FIG. 4 is a sectional assembly view of the bottom bracket bearing axle mounting structure of FIG. 3.
Figure 5:
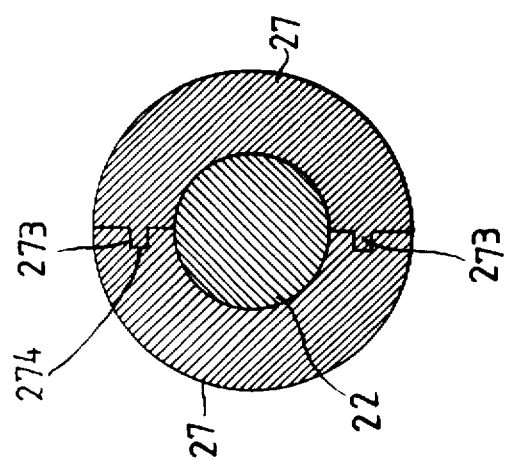
FIG. 5 is a cross section of a part of the present invention, showing the two symmetrical halves of the bush fastened together and mounted the bottom bracket bearing axle.

Referring to FIGS. from 3 to 5, the bottom bracket 21, comprised two inner threads 211; 212 bilaterally disposed at the bottom at the same elevation. A bottom bracket bearing axle 22 is mounted in the bottom bracket 21. Two screw caps 23; 24 respectively threaded into the inner threads 211; 212 of the bottom bracket 21 to hold the bottom bracket bearing axle 22 in place. The bottom bracket bearing axle 22 comprises two annular flanges 221; 222 raised around the periphery and equally spaced from its both ends. Two ball bearings 25; 26 are respectively mounted the bottom bracket bearing axle 22 within the screw caps 23; 241, having respective balls 251; 261 respectively supported on the annular flange 221; 222 at an outer side. A bush 27 is mounted within the bottom bracket 21 around the bottom bracket bearing axle 22 between the ball bearings 25; 26, having two ends flanges 271; 272 at two opposite ends respectively stopped against the ball bearings 25; 26. The bush 27 is comprised of two symmetrical halves injection-molded from wear resistant plastic and fastened together by fitting respective locating pins 273 into respective pin holes 274 (see FIG. 5). The bush 27 preferably has a corrugated outside wall (see FIG. 3).

I claim:

1. A bottom bracket ball bearing axle mounting structure comprising a bottom bracket, a bottom bracket wheel axle mounted in said bottom bracket and having two opposite ends respectively extended out of two opposite sides of said bottom bracket and two annular flanges raised around the periphery and equally spaced from its both ends, two screw caps fastened to said bottom bracket at two opposite sides to hold said bottom bracket wheel axle in place, two ball bearings respectively mounted in said screw caps to support said bottom bracket bearing axle with balls thereof respectively supported on said annular flanges of said bottom bracket bearing axle at an outer side, and bush mounted within said bottom bracket around said bottom bracket bearing axle between said ball bearings, wherein:

said bush is comprised of two symmetrical halves fastened together by a dowel joint and mounted within said bottom bracket around said bottom bracket bearing axle between said ball bearings, having a corrugated outside wall and two end flanges at two opposite ends respectively stopped against said ball bearings.

* * * * *